United States Patent
Hu et al.

(10) Patent No.: US 8,266,673 B2
(45) Date of Patent: Sep. 11, 2012

(54) POLICY-BASED PRIVACY PROTECTION IN CONVERGED COMMUNICATION NETWORKS

(75) Inventors: Qingmin James Hu, Sammamish, WA (US); Farooq Bari, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 737 days.

(21) Appl. No.: 12/402,606

(22) Filed: Mar. 12, 2009

(65) Prior Publication Data

US 2010/0235877 A1    Sep. 16, 2010

(51) Int. Cl.
*H04L 29/06* (2006.01)

(52) U.S. Cl. ............... 726/1; 726/12; 726/13; 726/22

(58) Field of Classification Search .................. None
See application file for complete search history.

(56) References Cited

U.S. PATENT DOCUMENTS

| | | | |
|---|---|---|---|
| 7,933,221 B1 * | 4/2011 | Pawar et al. ............... 370/253 |
| 8,160,579 B1 * | 4/2012 | Rosenberg ................... 726/13 |
| 2007/0056028 A1 * | 3/2007 | Kay ........................... 726/11 |
| 2007/0226775 A1 * | 9/2007 | Andreasen et al. ........... 726/1 |
| 2007/0234414 A1 * | 10/2007 | Liu ............................ 726/11 |
| 2008/0201772 A1 * | 8/2008 | Mondaeev et al. .......... 726/13 |
| 2010/0188991 A1 * | 7/2010 | Raleigh ..................... 370/252 |

OTHER PUBLICATIONS

3GPP, "Tachnical Specification Group Services and System Aspects: Policy and charging control architecture, Release 7" 3rd Generation Partnership Project, Sep. 2007.*

* cited by examiner

*Primary Examiner* — Jung Kim
*Assistant Examiner* — Robert Leung
(74) *Attorney, Agent, or Firm* — Turocy & Watson, LLP

(57) ABSTRACT

System(s) and method(s) that employ deep packet inspection (DPI) of data flow relating to a requested service associated with a communication device to facilitate customizing the service or results provided by the service are presented. A service request can be received by a gateway identification of the service is attempted. If the service is identified, a privacy rule(s), which is contained in a user privacy profile of a user associated with the communication device, is analyzed to determine whether the privacy rule(s) applies to the service. If the privacy rule(s) is applicable, a DPI engine performs DPI on the data flow, in accordance with the privacy rule(s), to obtain information that can be used to customize the service or results provided by the service. The user can specify the level of DPI to be applied. A default rule can specify that no DPI is performed on the data flow.

25 Claims, 8 Drawing Sheets

POLICY-BASED PRIVACY PROTECTION IN CONVERGED COMMUNICATION NETWORKS

TECHNICAL FIELD

The subject innovation generally relates to wireless communications, and, more particularly, to policy-based privacy protection in converged communication networks.

BACKGROUND

Mobile core networks are increasingly being opened up to migrate to a more Internet Protocol (IP)-based network. There are increasingly more online services (e.g., data services) becoming available as well as more integrated. For advanced data services associated with communication devices (e.g., mobile communication devices, such as cellular phones), particularly in a mobile core network, Internet Protocol (IP) packet inspection is a required mechanism. Typically, these packet inspections are limited to shallow packet inspections, where, for example, the source IP, destination IP, source port, destination port, and IP/Transmission Control Protocol (TCP)/User Datagram Protocol (UDP) headers are inspected. As services and applications becomes more integrated and customized, the knowledge of the IP layer is desirable, such as more policy-based deep packet inspection (DPI), where inspections go beyond the IP header, is desirable. Currently, there is no privacy protection mechanism in network data flow detection that will give user options for privacy protection.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) to perform deep packet inspection (DPI) to facilitate enforcing desired privacy protection for data flow associated with communication devices (e.g., mobile communication devices) in a network, such as a mobile core network. Conventionally, a network only performs shallow packet inspection of a data flow, where, for example, the source Internet Protocol (IP), destination IP, source port, destination port, and IP/Transmission Control Protocol (TCP)/User Datagram Protocol (UDP) headers are inspected. In an aspect of the disclosed subject matter, a DPI engine can be employed to perform DPI on data flow in accordance with one or more privacy rules related to a service(s) utilized by a communication device in a wireless communication environment. For instance, the DPI engine can utilize a privacy rule(s) (e.g., as specified by a user of a communication device) to facilitate inspecting other portions of the data flow, including, for example, data protocol structures and/or the payload (e.g., user data) associated with a communication, in addition to the IP header information. In another aspect, a user of a communication device can specify one or more privacy rules with regard to each type of service, as desired, and the privacy rules can be stored in a user privacy profile (e.g., subscription privacy profile) of the user, where user privacy profiles of respective users can be stored in a privacy policy database of the network, where the respective privacy rules can enable the DPI engine to perform DPI on data flow associated with service requests associated with respective communication devices of respective users.

In still another aspect, there can be a default privacy rule that can be set to "on" and can specify that the network can only detect user's traffic flow information at the IP/TCP/UDP header level, where no further data inspection is permitted. In this manner, a user does not have to be concerned with data flow associated with the user being subject to DPI without the user specifying the privacy preferences the user desires with regard to DPI.

In yet another aspect, the privacy rules can be based at least in part on type of access (e.g., public WLAN, cellular networks, etc.), where there can be different privacy rules, as desired, depending in part on the type of access; type of device (e.g., mobile handset, laptop computer, IP television (IPTV) set-top box, etc.), where there can be different privacy rules, as desired, depending in part on the type of device; type of service or user accessing the service, where, for example, a user can specify that third-party services are not allowed DPI-based information, but operator-based services can access DPI-based information; type of service (e.g., voice call, text message, email, voice mail, web browsing, roaming service, non-roaming service, etc.) being accessed, where there can be multiple concurrent privacy levels for different service types, as desired; and/or other factors.

In still another aspect, the core network can provide a communication device of a user with a list of available privacy rules with regard to a particular service. The list of available privacy rules can be based at least in part on the types of access available, type(s) of communication device(s), types of available services, and/or other factors, associated with the communication device or core network. The list of available privacy rules can be provided, for example, when a user first obtains or provisions the communication device, when a service is added with regard to the communication device, when the user requests the list of available privacy rules (e.g., to modify or update privacy rules in the user privacy profile), or as otherwise desired. For example, the list of available privacy rules can be provided in the form of a menu displayed to the user in an interface of the communication device or another communication device of the user, where the communication device or other communication device can receive input (e.g., selection action) from the user to select a desired privacy rule(s) from the list. The selected privacy rule(s) can be communicated from the communication device to the core network and can be utilized in real time in relation to a current service request (e.g., if applicable to the current service request) by the core network and/or stored in the user privacy profile of the user. For example, the selected privacy rule(s) (e.g., newly selected privacy rule, modified privacy rule) can be implemented dynamically by the core network in real time (e.g., during a current service request) to enable the DPI engine to utilize the selected privacy rule(s) to dynamically perform DPI on a data flow associated with a service request, such as a current service request, in accordance with the selected privacy rule(s) (e.g., when the selected privacy rule(s) is applicable to the data flow).

In yet another aspect, the DPI engine can evaluate a privacy rule(s) specified by a user in the user privacy profile and can determine whether modification of the privacy rule(s) can enable additional information related to the service to be provided to the communication device of the user and/or can enable the service to utilize the additional information to provide customized or optimized results. If modification of a current privacy rule(s) can enable additional information to be provided to the communication device of the user and/or enable the service to utilize the additional information to provide customized or optimized results, the DPI engine can facilitate providing a suggested privacy rule modification to the user and/or other information indicating the type of additional information that can be provided to the user if the user modifies the privacy rule(s) as suggested by the DPI engine, type of customized or optimized results that can be obtained from the service, and/or indicating the type(s) of information in the data flow that will be inspected by the DPI engine if the privacy rule(s) is modified in accordance with the suggested privacy rule modification.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
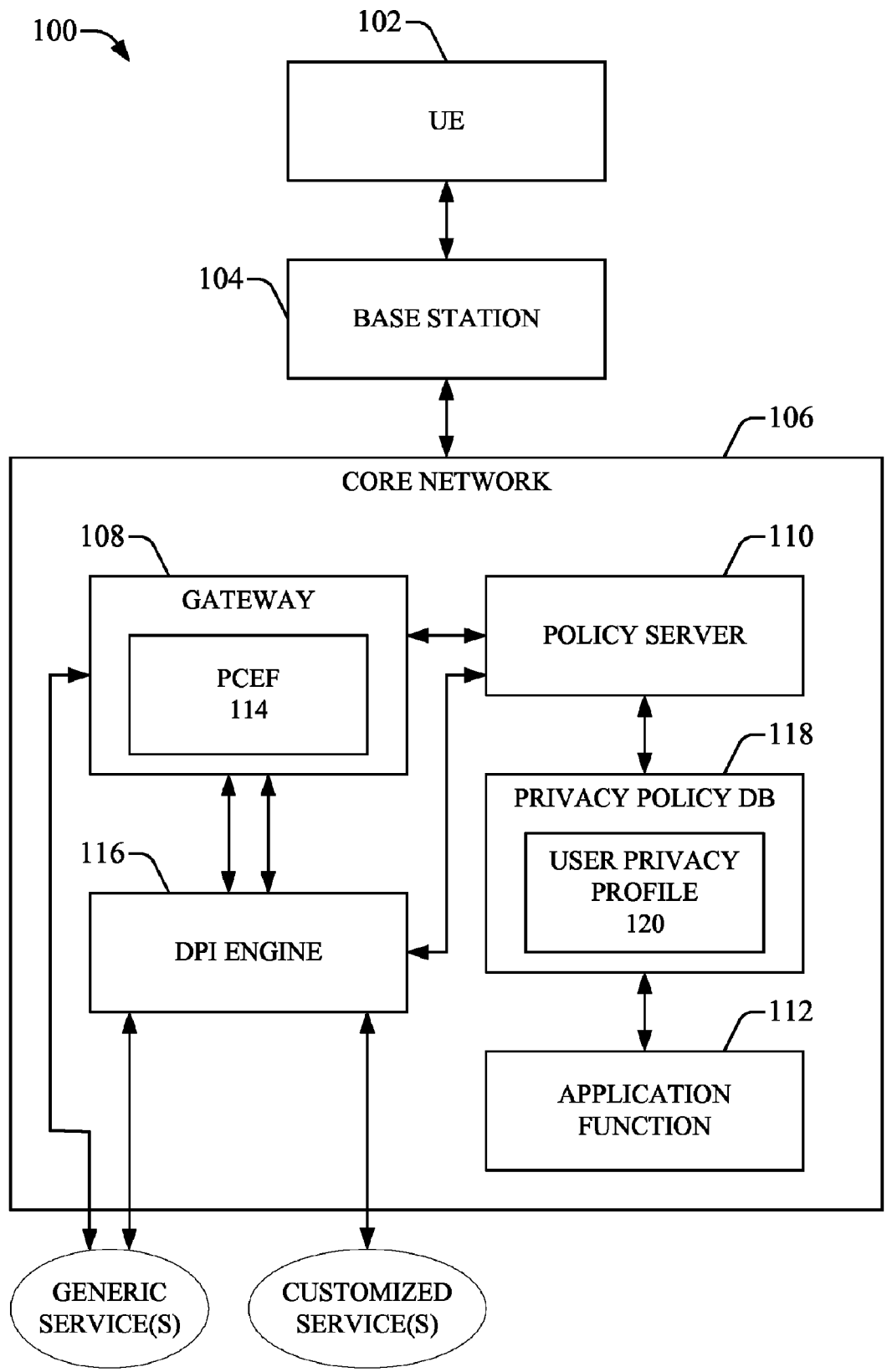
FIG. 1 is a block diagram of an example system that can employ deep packet inspection (DPI) to facilitate enforcing privacy preferences of users in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. As utilized herein, the term "prosumer" indicate the following contractions: professional-consumer and producer-consumer.

The following abbreviations are relevant to the subject specification.

3G Third Generation
3GPP Third Generation Partnership Project
AGPS Assisted GPS
AP Access Point
ADSL Asymmetric Digital Subscriber Line AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can employ deep packet inspection (DPI) to facilitate enforcing privacy preferences of users in accordance with an embodiment of the disclosed subject matter. In an aspect, example system 100 can include a UE 102 (e.g., mobile phone, such as a 3GPP UMTS phone, personal digital assistant (PDA), laptop computer, IP television (IPTV), set-top box, etc.) in a wireless communication environment. The UE 102 can be connected (e.g., wirelessly connected) to a base station 104 to facilitate communication in the wireless communication environment. The base station 104 can serve a coverage macro cell that can cover a specified area, and the base station 104 can service mobile wireless devices, such as UE 102, in the area covered by the macro cell, where such coverage can be achieved via a wireless link (e.g., uplink (UL), downlink (DL)). When an attachment attempt is successful, UE 102 can be served by base station 104 and incoming voice and data traffic can be paged and routed to the UE 102 through the base station 104, and outgoing voice and data traffic from the UE 102 can be paged and routed through the base station 104 to other communication devices (e.g., UE (not shown)).

In another aspect, the base station 104 can be connected to a core network 106 that also can be associated with other base stations (not shown) and other UEs (not shown). The core network 106 can include a gateway (GW) 108 that can be utilized to route data, convert or enforce protocols, translate signals, and/or perform other functions to facilitate system interoperability and communication in the wireless communication environment. The GW 108 can be associated with a policy server 110 (e.g., Policy and Charging Rules Function (PCRF)) in the core network 106, where the policy server 110 can be employed to facilitate authorizing Quality of Service (QoS) resources, coordinating or retrieving privacy rules related to privacy preferences of users, routing data traffic, aggregating subscriber and application data, linking service and transport layers, and/or performing other functions. In an aspect, a specified protocol (e.g., Diameter) can be employed to facilitate communication of information between the GW 108 and policy server 110. The policy server 110 can be connected to an Application Function (AF) 112 that can provide application level session information and/or other information to the policy server 110 to facilitate policy establishment and charging control. The policy server 110 also can be connected to a Policy and Charging Enforcement Function (PCEF) 114 that can perform data detection and policy enforcement, where the PCEF 114 can enforce Policy and Charging Control (PCC) rules received from policy server 110. For instance, the PCEF 114 can perform shallow packet inspection of data flow between communication devices (e.g., UE 102), where the shallow packet inspection typically can include inspecting certain subset of parameters, such as, for example, the source Internet Protocol (IP), destination IP, source port, destination port, and IP/Transmission Control Protocol (TCP)/User Datagram Protocol (UDP) headers. In accordance with an embodiment, the PCEF 114 can reside within GW 108 (as depicted), although the subject innovation is not so limited, as in accordance with various other embodiments, the PCEF 114 can be a stand-alone unit or can reside at least partially within another component.

Conventionally, a gateway can utilize an enforcement function to perform shallow packet inspection of information associated with mobile communication devices (e.g., UEs) associated with a core network. For advanced data services associated with mobile devices, particularly in the core network, IP packet inspection is a required mechanism. With increased integration of services and applications, knowledge of the IP layer knowledge is desirable or required, and it is desirable to employ more policy-based DPI, where inspections go beyond inspecting only the IP header information. Currently, there is no privacy protection mechanism in network data flow detection In accordance with various aspects and embodiments, the subject innovation can employ DPI to inspect data flow associated with service requests beyond IP header information, for example, in accordance with respective privacy preferences of respective users of communication devices (e.g., UE 102), where the privacy preferences can be expressed using privacy rules, which can be selected by respective users. In an aspect of the disclosed subject matter, the core network 106 can comprise a DPI engine 116 that can be employed to perform DPI on data flow in accordance with one or more privacy rules related to a service(s) utilized by a UE 102 in the wireless communication environment. For instance, the DPI engine can utilize a privacy rule(s) (e.g., as specified by a user of the UE 102) to facilitate inspecting other portions of the data flow, including, for example, data protocol structures and/or the data payload (e.g., user data) associated with a communication to or from the UE 102, in accordance with the privacy rule(s), in addition to the IP header information. By performing DPI on data flow associated with a service in accordance with applicable privacy rules, specified by a user of a UE 102 associated with the service, the service or results of the service can be customized or optimized. For instance, performing DPI on the data flow associated with a service can yield additional or customized information (e.g., including contextual information), as compared to the information obtained from shallow packet inspection, that can be used to provide customized (e.g., tailored) results to the UE 102 of the user.

In another aspect, the policy server 110 can be associated with a privacy policy database 118 that can store one or more user privacy profiles 120 of respective users of communication devices (e.g., UE 102) associated with the core network 106 in the wireless communication environment. A user of the UE 102 can specify one or more privacy rules, for example, with regard to each type of service, as desired, and the privacy rules can be stored in a user privacy profile 120 (e.g., subscription privacy profile) of the user, where the user privacy profiles 120 can be stored in the privacy policy database 118. The policy server 110 can be connected to the DPI engine 116 and can provide privacy rules retrieved from a desired user privacy profile 120 of a user of a UE 102 to the DPI engine 116, as desired (e.g., when the UE 102 attaches to the core network 106, when a service request associated with the UE 102 is received). In an aspect, a specified protocol (e.g., Diameter) can be employed to facilitate communication of information between the DPI engine 116 and policy server 110. The DPI engine 116 can employ the respective privacy rules to perform DPI on data flow relating to service requests associated with respective UEs 102 of respective users. For instance, when the UE 102 of the user is attached to the core network 106, the policy server 110 can retrieve the user privacy profile 120, or desired portion thereof, of the user from the privacy policy database 118 and can provide the user privacy profile 120, or desired portion thereof, to the PCEF 114 and/or the DPI engine 116, and the privacy preference(s) of the user can be enforced and protected at individual or aggregated IP flows level.

In an aspect, the GW 108 can receive a service request and can identify or attempt to identify a service associated with the received service request based at least in part on information contained in the service request. If the GW 108 is not able to identify a service associated with the service request, the GW 108 can forward or route traffic (e.g., data, voice, metadata, etc.) to be processed in accordance with a generic service. If the GW 108 can identify a service associated with the received service request, the GW 108 can forward or route traffic associated with the service request to the DPI engine 116, where the DPI engine 116 can further process the service request in accordance with the aspects disclosed herein.

When the GW 108 identifies a service related to a received service request, the GW 108 can forward traffic associated with the service to the DPI engine 116 to determine whether DPI is to be performed on data flow associated with the service request to facilitate providing a customized or optimized service. The DPI engine 116 also can identify or attempt to identify the service associated with the service request. It is to be noted that, even though the GW 108 can initially identify the service, there can be instances when the DPI engine 116 cannot identify received traffic, such as when certain information or parameters associated with the service are not included with the service request or cannot be identified by the DPI engine 116, which can result in the DPI engine 116 not being able to identify the service associated with the service request. If the service associated with the service request is not identified, the DPI engine 116 can forward the traffic associated with the service request to be processed in accordance with a generic service, where the service request can be processed without DPI being performed. If the service associated with the service request is identified, the DPI engine 116 can further process the service request to determine whether DPI is to be performed on data flow associated with the service request.

To facilitate determining whether DPI is to be performed in relation to a received service request, the DPI engine 116 can receive a privacy rule(s), if any, from a user privacy profile 120 of a user associated with the service request, where the user privacy profile 120 can be retrieved from the privacy policy database 118 via the policy server 110. The DPI engine 116 can analyze and/or evaluate a privacy rule(s) in the user privacy profile 120 and information associated with a service request to facilitate determining whether a privacy rule(s) applies to a service (e.g., identified service) associated with the received service request and thereby also determine whether DPI is to be performed. When a privacy rule(s) is applicable to data flow associated with a service request, the DPI engine 116 also can apply or enforce the privacy rule(s) to perform DPI on a data flow related to a service request when DPI is to be performed on traffic associated with an identified service. For instance, the enforcement component 220 can inspect a data flow (e.g., inspect data protocol structures and/or data payload of the data flow) associated with a service request to facilitate obtaining information that can be utilized to facilitate customizing the service or results provided by the service to the UE 102. The level of DPI performed on data flow can be based at least in part on the particular privacy rule applied to the data flow, where, for example, one type of privacy rule can be related to a higher level of DPI and can result in a deeper DPI (e.g., DPI performed on data protocol structures and data payload) being performed on the data flow than another type of privacy rule that relates to a lower level of DPI being performed (e.g., DPI performed on data protocol structures, but not the data payload).

In another aspect, based at least in part on whether the DPI engine 116 has identified the service associated with the received service request and whether a privacy rule(s) is applicable to an identified service associated with the received service request, the DPI engine 116 can forward or route traffic (e.g., data, voice, metadata, etc.) associated with a service request to be processed in accordance with a generic service or to be processed in accordance with a customized service. For instance, if the service associated with the service request is not identified or if the DPI engine 116 determines that no privacy rule is applicable to an identified service (e.g., based at least in part on a user privacy profile 120 of a user associated with the service request), the DPI engine 116 can forward the traffic associated with the service request to be processed in accordance with a generic service, where the service request can be processed without DPI being performed. If the service associated with the service request is identified by the DPI engine 116 and a privacy rule(s) is applicable in relation to the identified service, the DPI engine 116 can forward the traffic associated with the service request to be processed in accordance with a customized service based at least in part on the type of identified service and one or more privacy rules in the user privacy profile 120 associated with user associated with the service request.

In yet another aspect, the core network 106 can provide a UE 102 of a user with a list of available privacy rules with regard to a particular service. The list of available privacy rules can be based at least in part on the types of access available, type(s) of communication device(s), types of available services, and/or other factors, associated with the UE(s) 102. The list of available privacy rules can be provided, for example, when a user first obtains or provisions the UE 102, when a service is added with regard to the UE 102, when the user requests the list of available privacy rules, or as otherwise desired. For example, the list of available privacy rules can be provided in the form of a menu displayed to the user in an interface of the UE 102 or other communication device of the user, where the UE 102 or other communication device can receive input (e.g., selection action) from the user to select a desired privacy rule(s) from the list. The selected privacy rule(s) can be communicated from the UE 102 to the core network 106 and can be stored in the user privacy profile 120 of the user. In an aspect, the selected privacy rule(s) (e.g., newly selected privacy rule, modified privacy rule) can be implemented dynamically by the core network 106 in real time to enable the DPI engine 116 to utilize the selected privacy rule(s) to dynamically perform DPI on a data flow associated with a service request (e.g., a current service request) in accordance with the selected privacy rule(s) (e.g., when the selected privacy rule(s) is applicable to the data flow).

In an aspect, the DPI engine 116 or another component in the core network 106 also can modify, update, or remove a privacy rule(s) in a user privacy profile(s) 120 of a user(s) based at least in part on network or service conditions. In such instance, as desired, the user associated with a user privacy profile 120 can be notified of any change to privacy rules in the user privacy profile 120 via communication regarding such change from the core network 106 to the UE 102 or another communication device associated with the user. For example, there can be a change (e.g., temporary or permanent) in a network condition of the core network 106, which can result in a current privacy rule in a user privacy profile 120 being invalid or otherwise undesirable, and the DPI engine 116 or other component of the core network 106 can automatically update the user privacy profile 120 in real time to remove or modify the privacy rule (e.g., modify the privacy rule to the default privacy rule).

In still another aspect, there can be a default privacy rule that can be set to "on" and can specify that the network can only detect user's traffic flow information at a shallow packet inspection level (e.g., the IP/TCP/UDP header level), where no further data inspection is permitted. In this manner, a user does not have to be concerned with data flow associated with the user being subject to DPI without the user affirmatively specifying the privacy preferences, via privacy rules, the user desires with regard to DPI. Also, in another aspect, if the GW 108 is not able to identify a service associated with a service request, the GW 108 can determine that no DPI is to be performed on data flow associated with the service request (e.g., GW 108 will not be able to identify privacy rule applicable to the service). In such instance, the service request can be processed in a generic manner (e.g., shallow packet inspection, but no DPI, performed in relation to the desired service).

In yet another aspect, the privacy rules can be based at least in part on type of access (e.g., public WLAN, cellular networks, etc.), where there can be different privacy rules, as desired, depending in part on the type of access; type of device (e.g., mobile handset, laptop computer, IPTV, set-top box, etc.), where there can be different privacy rules, as desired, depending in part on the type of device; type of service or user accessing the service, where, for example, a user can specify that third-party services are not allowed DPI-based information, but operator-based services can access DPI-based information; type of service (e.g., voice call, text message, email, voice mail, web browsing, roaming service, non-roaming service, etc.) being accessed, where there can be multiple concurrent privacy levels for different service types, as desired; and/or other factors.

As an example of DPI utilizing privacy rules to customize or optimize services and results therefrom, a user can have a privacy policy rule that allows DPI to the level of inspection of data protocol structures and data payload for data flow related to location-based services associated with and web browsing on the UE 102. As a result, when a search is performed on the web browser of the UE 102, the DPI engine 116 can perform DPI to inspect data protocol structures and data payload of the data flow associated with the service requests, which can include a location service (e.g., Global Positioning System (GPS) service) that can identify a current location of the UE 102 and a search in a web browser, and the information regarding the current location of the UE 102 obtained due to the DPI performed on the data flow can be utilized to refine the search by using the current location of the UE 102 in the search, where the search results, or a portion thereof, can be based at least in part on the current location of the UE 102. For instance, if the search is related to restaurants or points of interest, the search can be refined using the current location information of the UE 102 to return at least some search results related to restaurants or other points of interest near the current location of the UE 102. As a further example, other services or applications (e.g., restaurant locator service, entertainment locator service, point-of-interest locator service, map service, can utilize the current location information of the UE 102 to provide improved or modified results, based at least in part on the current location of the UE 102, when the applicable privacy rule is set to allow DPI on data flow associated with the services or applications so that location information regarding the UE 102 can be obtained from the data flow.

In still another example, the user can set a privacy rule that allows DPI of emails down to a data payload level on emails received by the UE 102. The privacy rule can further provide that, when the DPI is performed on the email messages by the DPI engine 116, if certain words are contained in the email message that indicate an email is of importance of priority to the user, based at least in part on predefined priority criteria, the email service, in conjunction with the DPI engine 116, can provide an alert to the user regarding the email or can highlight the email when displayed in the interface of the UE 102 so that the user is aware of the email flagged as a priority. In another aspect, a privacy rule can specify that emails determined to be spam or of low priority can be filtered and re-routed to another communication device (e.g., home computer) of the user, and the DPI engine 116 can perform DPI on the emails and can analyze the data payload of the emails in accordance with the predefined priority criteria to filter and re-route low priority level and spam emails to the other communication device of the user, and route emails determined to be high priority to the UE 102.

As yet another example of employing DPI in accordance with privacy rules, a user can set a privacy rule related to the UE 102 of the user that specifies that, during a specified time period (e.g., one time event, recurring on a periodic basis), a voice call(s) (e.g., phone call) from a subset of contacts of the user (e.g., spouse of the user) can be routed to the UE 102, but voice calls from anyone else are to be routed directly to voice mail without causing the UE 102 to alert (e.g., ring) the user of the voice call. This privacy rule can be stored in the user privacy profile 120 of the user. When a voice call is place to the UE 102 of the user, the GW 108 and/or DPI engine 116 can identify the service requested (e.g., voice call) and can obtain the applicable privacy rule from the user privacy profile 120 via the policy server 110. The applicable privacy rule can specify that DPI is to be performed to such a level that at least the identity of the communication device (e.g., and the associated user) making the voice call can be obtained from the data flow associated with the service request. The DPI engine 116 can perform DPI on the data flow in accordance with the applicable privacy rule and can identify the communication device (e.g., and associated user) desiring to call the UE 102 of the user. The DPI engine 116 can analyze the information obtained from DPI of the data flow and the parameters of the privacy rule. If the voice call is from a contact in the subset, the DPI engine 116 can facilitate routing the voice call to the UE 102 to alert the user to the voice call (e.g., UE 102 can ring); if the voice call is not from a contact in the subset, the DPI engine 116 can facilitate routing the voice call to voice mail associated with the user of the UE 102 (e.g., without the UE 102 ringing to alert the user of the voice call).

In yet another aspect, the DPI engine 116 can evaluate a privacy rule(s) specified by a user in the user privacy profile 120 associated with the user and can determine whether modification of the privacy rule(s) can enable additional information to be provided to the UE 102 of the user. If modification of a current privacy rule(s) (e.g., rule with a high privacy setting, such as no DPI or minimal DPI to be performed on a data flow) to a different privacy rule (or setting) (e.g., rule with a lower privacy setting that the current privacy rule, where more in-depth DPI can be performed on a data flow) can enable additional information to be provided to the UE 102 of the user, the DPI engine can facilitate providing a suggested privacy rule modification to the user and/or other information indicating the type(s) of customization of the service or results therefrom and/or the type(s) of additional information that can be provided to the user if the user modifies the privacy rule(s) as suggested by the DPI engine 116 and/or indicating the type(s) of information in the data flow that will be inspected by the DPI engine 116 if the privacy rule(s) is modified in accordance with the suggested privacy rule modification. If the user desires to modify the privacy rule(s) as suggested, the user privacy profile 120 can be updated with the privacy rule(s) modification.

It is to be appreciated and understood that the subject innovation is depicted in FIG. 1 as having one UE, one base station, and one user privacy profile; however, the subject innovation is not so limited, as there can be more than one UE, base station, or user privacy profile, as desired. It is to be further appreciated and understood that, while the DPI engine 116 is shown as being a separate unit from the GW 108, the subject innovation is not so limited, as, in accordance with various embodiments, the DPI engine 116 can be contained within the GW 108 or another component associated with the system 100.

The subject innovation can be easily implemented as the DPI engine 116 and other components of the subject innovation can be implemented with existing network infrastructure. The subject innovation also can facilitate providing network wide protection, as it can provide privacy at IP flow level for each user (e.g., subscriber) in the network 106. Further, in accordance with the subject innovation, there is virtually no burden on user, since the default privacy rule, which specifies that no DPI be performed on data flow, can be employed unless the user modifies the default privacy rule to another setting. The subject innovation also enables a user to customize the privacy preferences, for example, by specifying which type of data flow or services a privacy rule(s) is to be applied. Furthermore, the subject innovation is policy based: policy can be used for privacy protection.

In accordance with one embodiment of the subject innovation, the GW 108 and/or the DPI engine 116 can utilize artificial intelligence (AI) methods to infer (e.g., reason and draw a conclusion based at least in part on a set of metrics, arguments, or known outcomes in controlled scenarios) regarding identification of a service associated with a UE 102; whether a privacy rule applies to a requested service; customizing or optimizing a service or results obtained from providing the service; a type of access, type of device, and/or type of service; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 to facilitate rendering an inference(s) related to the system 100.

In particular, the GW 108 and/or the DPI engine 116 can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 to facilitate making inferences or determinations related to system 100.

Figure 2:
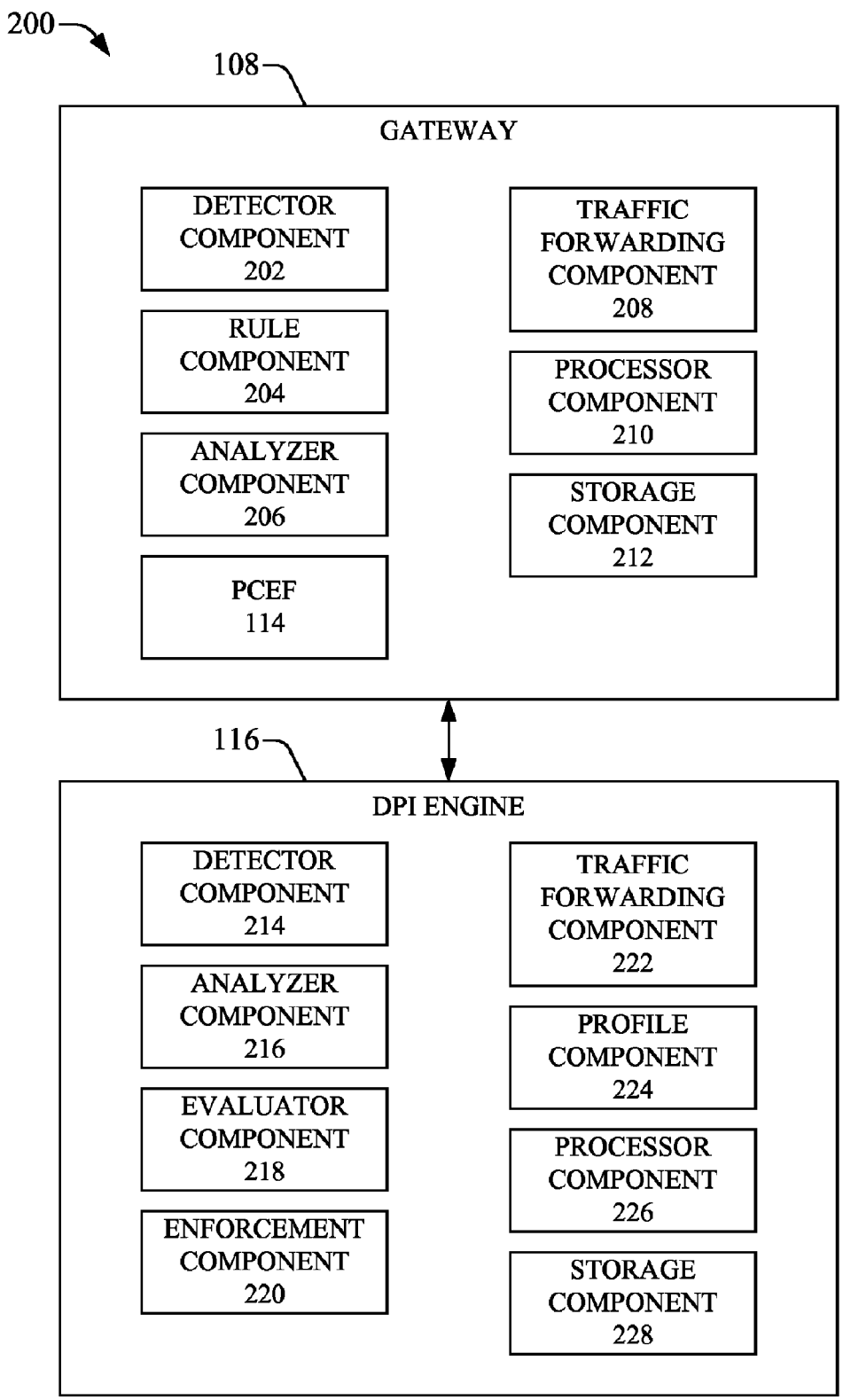
FIG. 2 is a block diagram of an example system that can employ DPI using privacy rules to facilitate customizing or optimizing services associated with a communication device in accordance with an aspect of the disclosed subject matter.

FIG. 2 is a block diagram of an example system 200 that can employ DPI using privacy rules to facilitate customizing or optimizing services associated with a communication device in accordance with an aspect of the disclosed subject matter. The example system 200 can comprise a GW 108 that can comprise a detector component 202 that can detect or identify a service related to a service request associated with a UE 102 and received by the GW 108. The GW 108 also can include a rule component 204 that can receive privacy rule selections from a UE 102 associated with a user to facilitate creating or updating the user privacy profile 120 of the user and/or can receive privacy rules from a user privacy profile 120 of the user of a UE 102. The rule component 204 can forward the privacy rule selections to a policy server 110 to facilitate creating or updating the user privacy profile of the user. The rule component 204 also can receive the privacy rule(s) from the user privacy profile 120 to facilitate enabling the GW 108 to determine whether the privacy rule(s) is applicable to the requested service.

GW 108 also can contain an analyzer component 206 that can analyze a service request and can operate in conjunction with the detector component 202 to facilitate identifying a requested service. The analyzer component 206 also can analyze a privacy rule(s) from a user privacy profile 120 to determine whether the privacy rule(s) is applicable or related to the requested service. GW 108 also can comprise a PCEF 114 that can enforce PCC rules received from the policy server 110. For instance, the PCEF 114 can perform shallow packet inspection of data flow between communication devices (e.g., UE 102).

In another aspect, the GW 108 can comprise a traffic forwarding component 208 that can forward or route traffic (e.g., data, voice, metadata, etc.) to a generic service or the DPI engine 116 based at least in part on whether the detector component 202 and/or analyzer component 206 have identified the service associated with the received service request. For instance, if the service associated with the service request is not identified, the traffic forwarding component 208 can forward the traffic associated with the service request so that the traffic can be processed in accordance with a generic service, where the service request can be processed without DPI being performed; if the service associated with the service request is identified, the traffic forwarding component 208 can forward the traffic associated with the service request to the DPI engine 116, where the DPI engine 116 can further process the service request in accordance with the aspects disclosed herein.

The GW 108 also can employ a processor component 210 that can operate in conjunction with other components of the GW 108 (e.g., PCEF 114, detector component 202, analyzer component 206, traffic forwarding component 208, etc.) and can process data related to service requests, privacy rules, and/or other data, and/or execute code associated with functions related to the GW 108. In an aspect, the processor component 210 can be connected to a storage component 212 that can comprise volatile and/or nonvolatile memory to store data or metadata related to detecting a service associated with a service request, determining whether a privacy rule is applicable to a requested service, applying or enforcing PCC rules, forwarding traffic associated with service requests, and/or other functions associated with the GW 108. The nonvolatile memory can include, but is not limited to, flash memory (e.g., single-bit flash memory, multi-bit flash memory), read-only memory (ROM), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). Volatile memory can include, but is not limited to, random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

In accordance with various other aspects, the GW 108 can be associated with a DPI engine 116 that can perform DPI on data flow associated with a requested service in accordance with applicable privacy rules. The DPI engine 116 can comprise a detector component 214 that can detect or identify a service related to a service request associated with a UE 102 and received by the GW 108 and DPI engine 116. For instance, the detector component 202 of GW 108 can identify a service associated with a received service request and the traffic forwarding component 208 can facilitate forwarding traffic associated with the service request to the DPI engine 116. The detector component 214 of the DPI engine 116 can identify or at least attempt to identify the service associated with the received service request. It is to be noted that, even though detector component 202 of GW 108 can initially identify the service, there can be instances when the detector component 214 of the DPI engine 116 is not able to identify received traffic associated with a service request, such as when certain information or parameters associated with the service are not included with the service request or cannot be identified by the detector component 214, which can result in the detector component 214 not being able to identify the service associated with the service request.

The DPI engine 116 also can comprise an analyzer component 216 that can analyze a privacy rule(s) (e.g., analyze a dynamically implemented privacy rule in real time) related to a service request and information associated with a service request, and can operate in conjunction with an evaluator component 218 that can evaluate the privacy rule(s) and/or the information to facilitate determining whether a privacy rule(s) applies to a service associated with the received service request and, if DPI is to be performed, performing DPI on the data flow in accordance with the privacy rule(s). The DPI engine 116 also can include an enforcement component 220 that can facilitate applying or enforcing (e.g., implementing) the privacy rule(s) to perform DPI on a data flow related to a service request when DPI is to be performed on traffic associated with an identified service. For instance, the enforcement component 220 can inspect a data flow (e.g., inspect data protocol structures and/or data payload of the data flow) associated with a service request to facilitate obtaining information that can be utilized to facilitate customizing the service or results provided by the service to the UE 102.

In another aspect, the DPI engine 116 can comprise a traffic forwarding component 222 that can forward or route traffic (e.g., data, voice, metadata, etc.) associated with a service request to be processed in accordance with a generic service or to be processed in accordance with a customized service based at least in part on whether the detector component 214 and/or analyzer component 216 have identified the service associated with the received service request and whether a privacy rule(s) is applicable to an identified service associated with the received service request. For instance, if the service associated with the service request is not identified or if the analyzer component 216 determines that no privacy rule is applicable to an identified service (e.g., based at least in part on a user privacy profile 120 of a user associated with the service request), the traffic forwarding component 222 can forward the traffic associated with the service request to be processed in accordance with a generic service, where the service request can be processed without DPI being performed; if the service associated with the service request is identified in the DPI engine 116, the traffic forwarding component 222 can forward the traffic associated with the service request to be processed in accordance with a customized service based at least in part on the identified service and one or more privacy rules in the user privacy profile 120 associated with user who is associated with the service request. In still another aspect, the DPI engine 116 can include a profile component 224 that can facilitate creating, modifying, or updating privacy rules to be stored in a user privacy profile 120 associated with a user of a UE 102 in accordance with privacy preferences and/or privacy rule selections received from a UE 102 associated with the user.

The DPI engine 116 also can contain a processor component 226 that can operate in conjunction with other components of the DPI engine 116 (e.g., detector component 214, analyzer component 216, evaluator component 218, enforcement component 220, traffic forwarding component 222, profile component, 224, etc.) and can process data related to service requests, privacy rules, and/or other data, and/or execute code associated with functions related to the DPI engine 116. The processor component 226 can be connected to a storage component 228 that can comprise volatile and/or nonvolatile memory to store data or metadata related to detecting a service associated with a received service request, analyzing or evaluating an identified service to determine whether a privacy rule(s) applies to the identified service, analyzing or evaluating a data flow associated with a service request, applying or enforcing privacy rules, creating or updating privacy rules associated with user privacy profiles 120, and/or other functions associated with the DPI engine 116. The nonvolatile memory can include, but is not limited to, flash memory (e.g., single-bit flash memory, multi-bit flash memory), read-only memory (ROM), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)). Volatile memory can include, but is not limited to, random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 3:
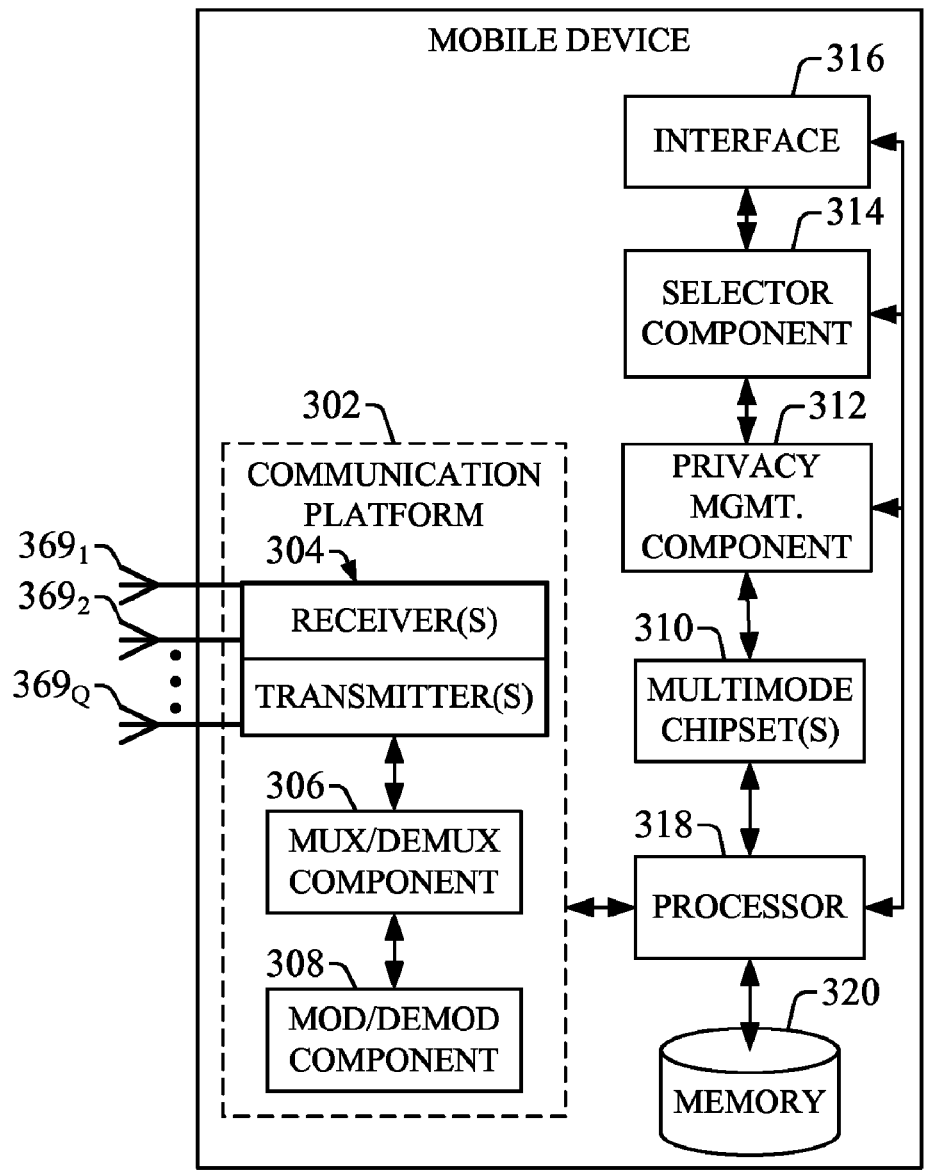
FIG. 3 depicts a block diagram of an example mobile device in accordance with an aspect of the disclosed subject matter.

FIG. 3 depicts a block diagram of an example mobile device 300 in accordance with an aspect of the disclosed subject matter. In an aspect, the mobile device 300 can be a multimode access terminal, wherein a set of antennas $369_1$-$369_Q$ (Q is a positive integer) can receive and transmit signal(s) from and to wireless devices like access points, access terminals, wireless ports and routers, and so forth, that operate in a radio access network. It should be appreciated that antennas $369_1$-$369_Q$ are a part of communication platform 302, which comprises electronic components and associated circuitry that provide for processing and manipulation of received signal(s) and signal(s) to be transmitted; e.g., receivers and transmitters 304, multiplexer/demultiplexer (mux/demux) component 306, and modulation/demodulation (mod/demod) component 308.

In another aspect, multimode operation chipset(s) 310 can allow the mobile device 300 to operate in multiple communication modes in accordance with disparate technical specification for wireless technologies. In an aspect, multimode operation chipset(s) 310 can utilize communication platform 302 in accordance with a specific mode of operation (e.g., voice, Global Positioning System (GPS)). In another aspect, multimode operation chipset(s) 310 can be scheduled to operate concurrently (e.g., when Q>1) in various modes or within a multitask paradigm.

In still another aspect, the mobile device 300 can comprise a privacy management component 312 that can be utilized to select one or more privacy rules in relation to services to implement privacy preferences of the user with regard to the level of inspection of data flow associated with the mobile device 300. For instance, the user can prefer to not allow DPI on data flow associated with the device 300. The privacy management component 312, in conjunction with a selector component 314, can communicate with the core network 106 to effectuate the user's privacy preference(s), where the user privacy profile 120 of the user can be updated so that no DPI is performed on data flow associated with the mobile device 300. It is to be appreciated that the user privacy profile 120 also can contain a default rule set to "on", where the default rule can specify that no DPI is to be performed, so the user does not have to take any action in order to maintain that no DPI be performed (unless the user had previously updated the user privacy profile 120 to have some level of DPI performed on data flow).

In an aspect, when a user desires to set a privacy rule(s), one or more available privacy rules related to a service(s) can be received from the core network 106 and displayed in an interface 316 of the mobile device 300. The selector component 314 can enable a user to select a desired privacy rule setting(s) in the interface 316 (e.g., graphical user interface, keyboard, keypad, mouse, track ball, voice interface, etc.). When the selector component 314 is used to select a desired privacy rule(s), based at least in part on received input from a user (e.g., pressing a key associated with a privacy rule, pressing a location on a screen associated with a privacy rule, saying an identifier associated with a privacy rule, etc.), the privacy management component 312 can communicate the selected privacy rule(s) to the core network 106, where the selected privacy rule(s) can be stored in the user privacy profile 120 in the privacy policy database 118 and implemented by the DPI engine 116. When a privacy rule(s) is selected and/or stored in the user privacy profile 120, the selected privacy rule(s) can be implemented dynamically in real time by the core network 106 to perform DPI on data flow associated with a related service (e.g., associated with a current service request) when the privacy rule(s) is applicable and DPI is otherwise applicable (e.g., a selected privacy rule can be communicated to the core network 106 and loaded directly into a component, such as a processor, of the DPI engine 116 so that the selected privacy rule can be implemented dynamically).

The mobile device 300 also can include a processor(s) 318 that can be configured to confer functionality, at least in part, to substantially any electronic component within the mobile device 300, in accordance with aspects of the subject innovation. As an example, processor(s) 318 can be configured to execute, at least in part, instructions in multimode operation chipset(s) that afford multimode communication through the mobile device 300, such as, for example, concurrent or multitask operation of two or more chipset(s). As another example, the processor(s) 318 can facilitate enabling the mobile device 300 to receive and convey signaling and content(s) (e.g., various data flows) that are part of an active management act initiated by a subscriber that operates the mobile device 300, or an approval cycle associated with auxiliary subscribers (e.g., secondary subscriber, tertiary subscriber, . . . ). Moreover, the processor(s) 318 can facilitate enabling the mobile device 300 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. The mobile device 300 also can contain a memory 320 that can store data structures (e.g., user data, metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In an aspect, the processor(s) 318 can be functionally coupled (e.g., through a memory bus) to the memory 320 in order to store and retrieve information desired to operate and/or confer functionality, at least in part, to communication platform 302, multimode operation chipset(s) 310, privacy management component 312, selector component, 314, interface 316, and/or substantially any other operational aspects of the mobile device 300. The memory 320 can comprise nonvolatile memory and/or volatile memory, where the nonvolatile memory can include, but is not limited to, flash memory (e.g., single-bit flash memory, multi-bit flash memory), read-only memory (ROM), mask-programmed ROM, programmable ROM (PROM), Erasable PROM (EPROM), Ultra Violet (UV)-erase EPROM, one-time programmable ROM, electrically erasable PROM (EEPROM), and/or nonvolatile RAM (e.g., ferroelectric RAM (FeRAM)); and volatile memory can include, but is not limited to, random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

In view of the example systems described herein, example methodologies that can be implemented in accordance with the disclosed subject matter can be better appreciated with reference to flowcharts in FIGS. 4-7. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 4:
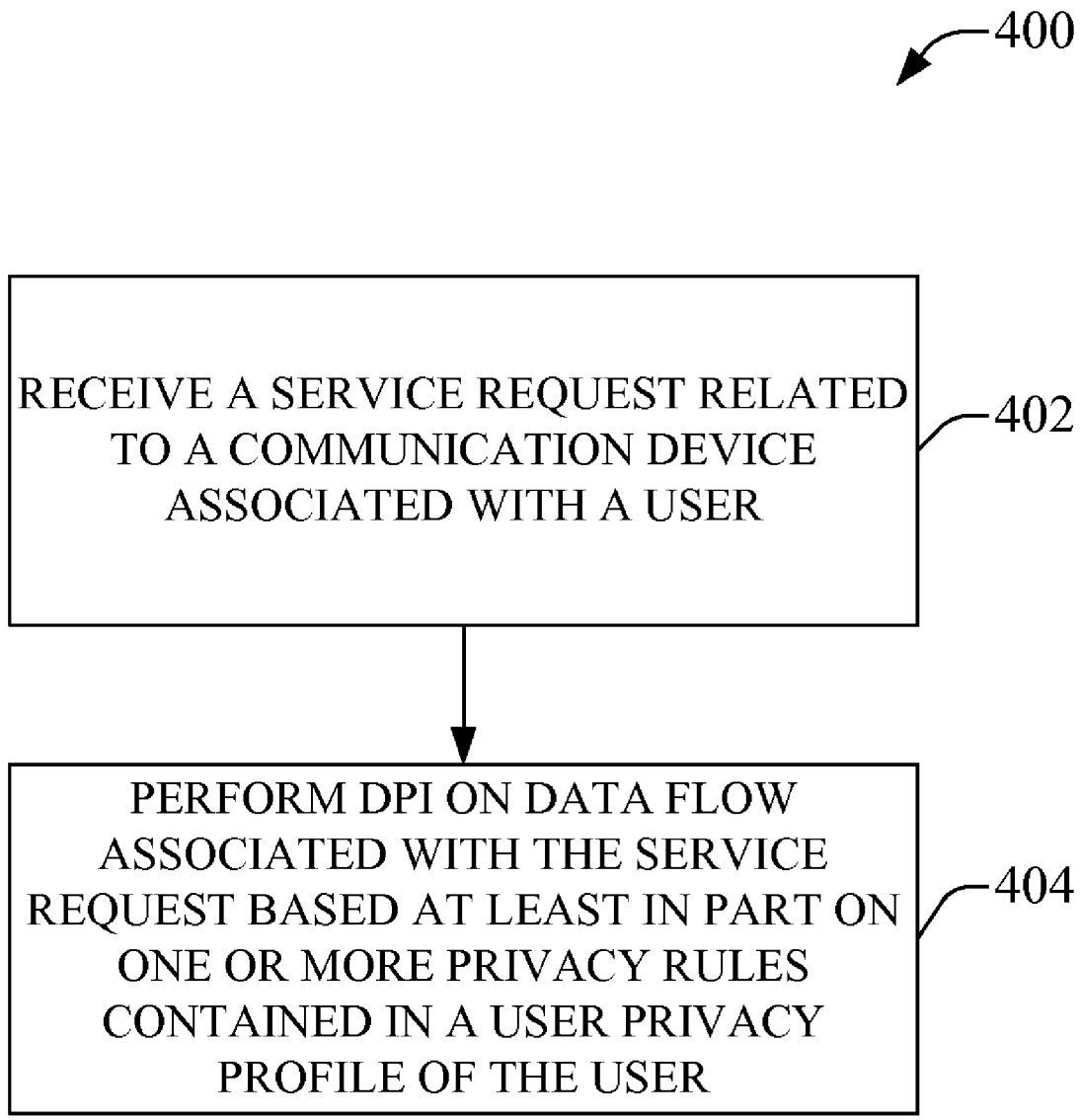
FIG. 4 illustrates a flowchart of an example methodology for employing DPI on data flow associated with a UE in accordance with an aspect of the disclosed subject matter.

FIG. 4 presents a flowchart of an example methodology 400 for employing DPI on data flow associated with a UE in accordance with an aspect of the disclosed subject matter. At 402, a service request related to a UE (e.g., communication device, such as a mobile phone) associated with a user can be received. In an aspect, a service request (e.g., request for Internet access, request for a voice call, etc.) can be received by a GW 108 from a UE 102 associated with the core network 106.

At 404, DPI can be performed on data flow (e.g., data packets) associated with the service request based at least in part on one or more privacy rules contained in a user privacy profile of the user to facilitate processing the service request in accordance with the one or more privacy rules (e.g., customizing and/or optimizing the requested service or results therefrom in accordance with the applicable privacy rule(s)). In an aspect, a DPI engine 116 can perform DPI on the data flow associated with the service request in accordance with one or more privacy rules in the user privacy profile 120 of the user associated with the UE 102 related to the service request. For example, the service request can be related to the UE 102 receiving a phone call, an email, or text message, or requesting to access the Internet. In another aspect, the DPI can include inspecting not only the IP/TCP/UDP header information in data flow associate with the service request, but also can include deeper inspection of the data flow, such as inspection of data protocol structures and/or data payload, in accordance with the privacy rule(s) in the user's privacy profile 120. For example, another user can use another communication device to send an email to the UE 102 of the user. The GW 108 can receive the service request related to the email and a service associated with the service request can be identified. The user privacy profile 120 of the user can be retrieved from the privacy policy database 118 to determine whether there are any privacy rules in the user privacy profile 120 applicable to the service request. If a privacy rule(s) is applicable to the requested service, the DPI engine 116 can analyze data protocol structures and/or data payload in the data flow associated with the service based at least in part on the privacy rule(s). In an aspect, performing DPI on the data flow associated with the service can yield additional or customized information (e.g., results) with regard to the service than would be obtained if only a shallow packet inspection is performed on the data flow.

Figure 5:
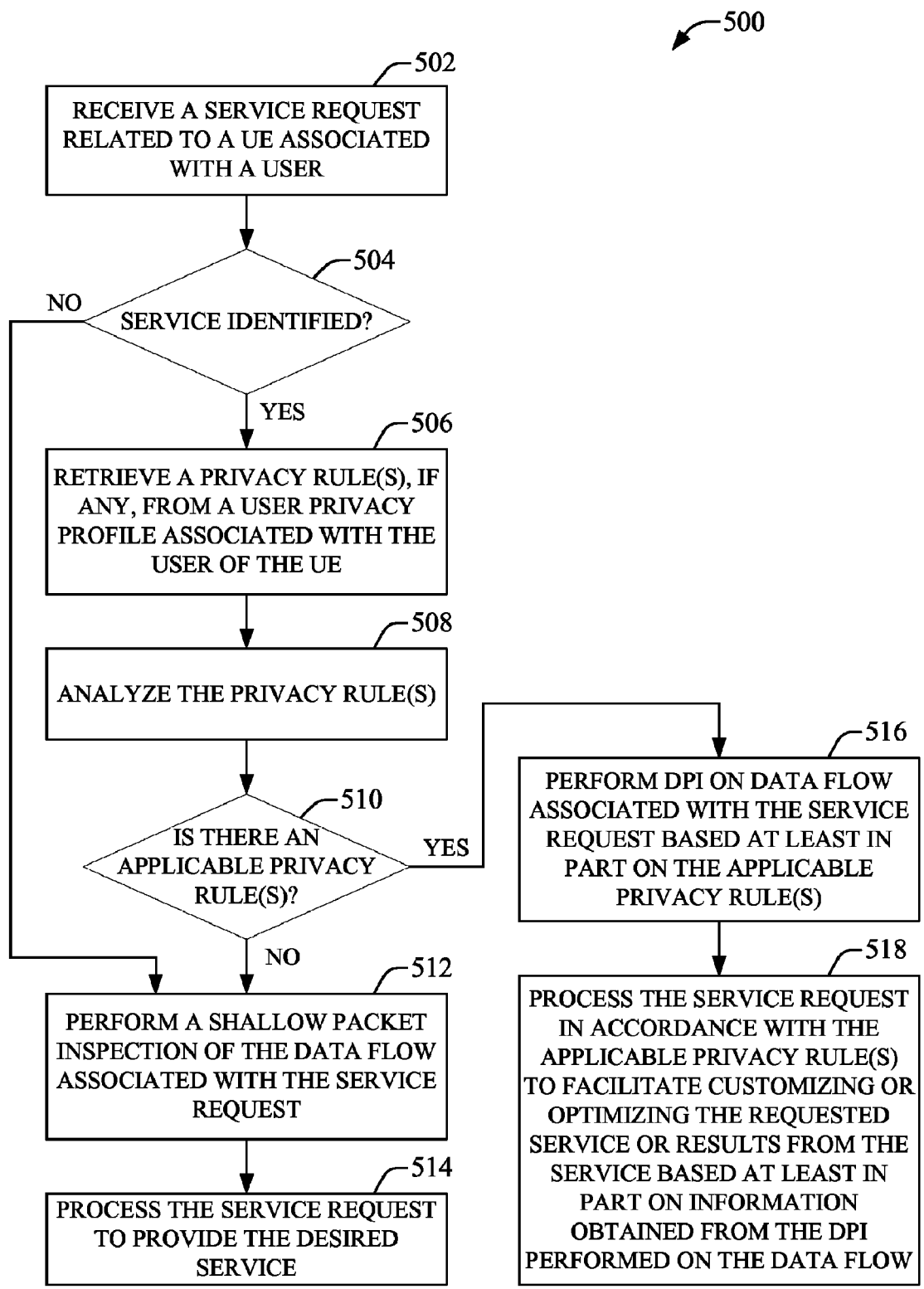
FIG. 5 depicts a flowchart of an example methodology that can employ DPI on data flow associated with a UE in accordance with an aspect of the disclosed subject matter.

FIG. 5 depicts a flowchart of an example methodology 500 that can employ DPI on data flow associated with a UE in accordance with an aspect of the disclosed subject matter. At 502, a service request related to a UE associated with a user can be received. In an aspect, the service request (e.g., request for Internet access, request for a voice call, etc.) can be received by a GW 108 from a UE 102 (e.g., the user's communication device, another communication device attempting to communicate with the user's communication device) associated with the core network 106.

At 504, a determination can be made regarding whether the service associated with the service request can be identified. In an aspect, the GW 108 can analyze the received service request to detect or determine the type of service requested. Further, when a service request is received by the DPI engine 116 (e.g., when GW 108 has initially identified a service associated with the service request and determined that the service request is to be routed to the DPI engine 116), the DPI engine 116 also can identify or attempt to identify a service associated with the service request, as it is to be noted that, even though the GW 108 can initially identify the service, there can be instances when the DPI engine 116 cannot identify received traffic of a service request, such as when certain information or parameters associated with the service are not included with the service request or cannot be identified by the DPI engine 116, which can result in the DPI engine 116 not being able to identify the service associated with the service request. If the service is identified in the service request, at 506, a privacy rule(s), if any, can be retrieved from a user privacy profile associated with the user of the UE. In an aspect, the GW 108 and/or DPI engine 116 can retrieve the privacy rule(s) from the user privacy profile 120. At 508, the privacy rule(s) can be analyzed to facilitate determining whether any of the privacy rules are applicable to the data flow associated with the requested service.

At 510, a determination can be made regarding whether there is a privacy rule(s) that is to be applied to the data flow associated with the service request. In an aspect, the GW 108 can request the policy server 110 to retrieve a user privacy profile 120 of the user of the UE 102 associated with the service request, and the content (e.g., privacy rule(s)) of the user privacy profile 120 can be analyzed to facilitate determining whether there are any privacy rules applicable to the service request.

If it is determined that there is no privacy rule applicable to the service associated with the service request, at 512, a shallow packet inspection of the data flow (e.g., inspection of the IP/TCP/UDP header information) associated with the service request can be performed. In an aspect, the PCEF 114 can perform a shallow packet inspection to inspect, for example, the IP/TCP/UDP header information of the data flow associated with the service request in accordance with applicable rules. Since no privacy rules are determined to be applicable, no DPI is performed on the data flow associated with the service request and the dataflow associated with the service request is processed in accordance with a generic service. At 514, the service request is processed to provide the desired service.

Referring again to reference numeral 504, if, at 504, a service cannot be identified, methodology 500 can proceed to reference numeral 512, where a shallow packet inspection of the data flow (e.g., inspection of the IP/TCP/UDP header information) associated with the service request can be performed. Since the service cannot be identified in the service request, it cannot be determined whether any privacy rules related to privacy preferences of the user of the UE 102 are applicable to the requested service. In this instance, shallow packet inspection can be performed on the data flow associated with the service request, but no DPI is performed on the data flow, and the dataflow associated with the service request is processed in accordance with a generic service. Methodology 500 can proceed from this point (e.g., to reference numeral 514).

Referring again to reference numeral 510, if, at 510, it is determined that there is a privacy rule(s) applicable or related to the service request), methodology 500 can proceed to reference numeral 516, and, at 516, DPI can be performed on data flow associated with the service request based at least in part on the applicable privacy rule(s) from the user privacy profile of the user of the UE. In an aspect, the DPI engine can perform the DPI and the DPI can comprise inspection of at least a portion of the data protocol structures and/or data payload in the data flow associated with the service request in accordance with the applicable privacy rule(s), in addition to inspection of the IP/TCP/UDP header being performed.

At 518, the service request can be further processed in accordance with the applicable privacy rule(s) to facilitate customizing or optimizing the requested service or results from the service based at least in part on information obtained from the DPI performed on the data flow. In an aspect, the applicable privacy rule(s) can facilitate customizing and/or optimizing the requested service or results from the service, where the customization and/or optimization of the service can relate to, for example, routing, filtering, formatting, etc., of the data, or portion thereof, associated with the request. For instance, performing DPI on the data flow associated with the service can yield additional or customized information (e.g., results) with regard to the service than would be obtained if only a shallow packet inspection is performed on the data flow.

Figure 6:
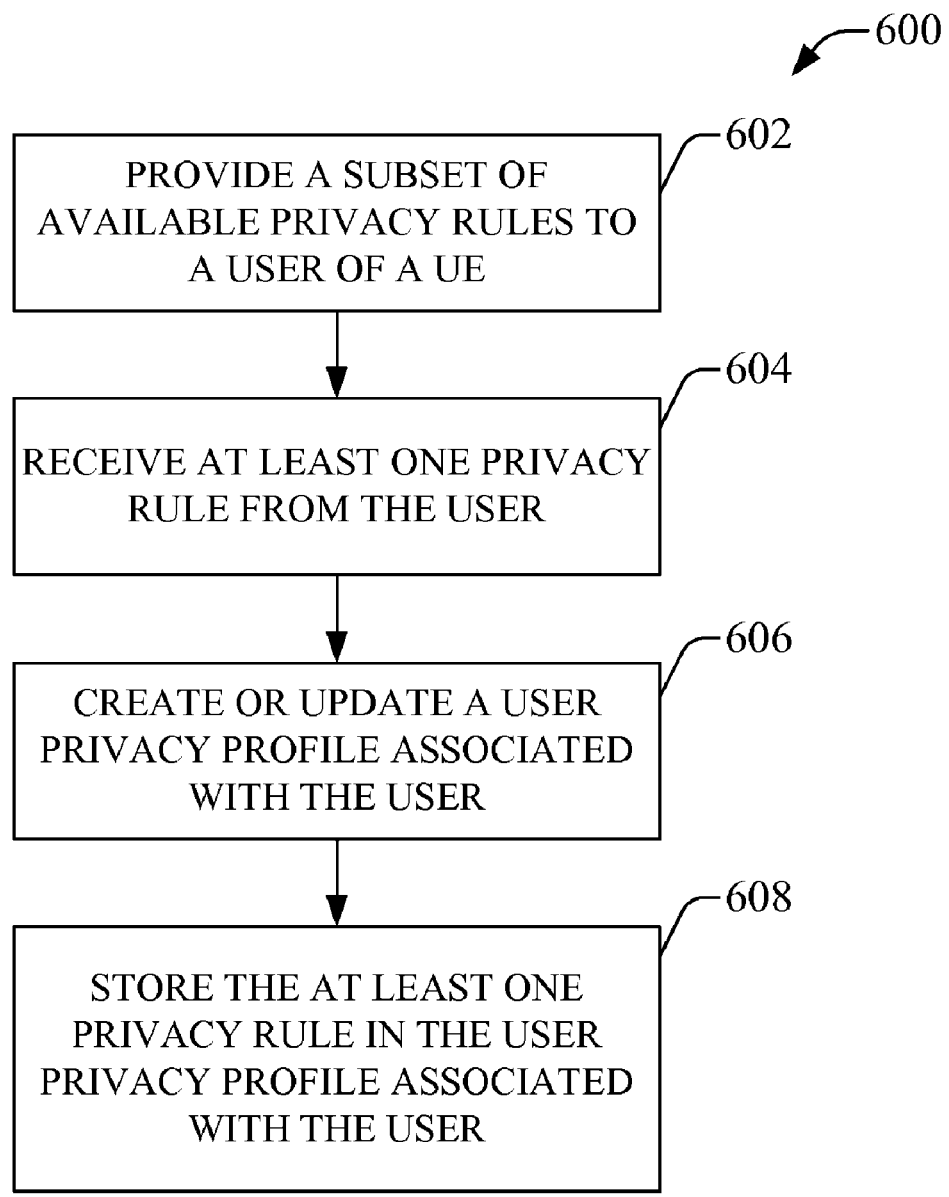
FIG. 6 illustrates a flowchart of an example methodology that can create a user privacy profile to store privacy rules in accordance with an aspect of the disclosed subject matter.

FIG. 6 illustrates a flowchart of an example methodology 600 that can create a user privacy profile to store privacy rules in accordance with an aspect of the disclosed subject matter. At 602, a subset of available privacy rules can be provided to a user of a UE. In an aspect, the core network 106 can provide a subset of available privacy rules to the UE 102 (e.g., or another communication device) of the user. The subset of available privacy rules provided can be based at least in part on the types of access available, type(s) of communication device(s), types of available services, and/or other factors, associated with the communication device(s). The subset of available privacy rules can be provided, for example, when a user first obtains or provisions the UE 102, when a service is added with regard to the UE 102, when the user requests the subset, or as otherwise desired.

At 604, at least one privacy rule can be received from the user via the UE (e.g., or another communication device). In an aspect, the user can utilize the UE 102 (e.g., or another communication device) to select one or more privacy rules related to a service(s), which can be employed in relation to the UE 102, from the subset of available privacy rules, and the selection of the privacy rule(s) can be received by the core network 106. If the user does not desire to allow DPI of data flow associated with a service(s), the user will not select any privacy rule from the subset, no privacy rule selection will be received by the core network 106, and the user privacy profile 120 can continue to have the default rule of no DPI set to "on" (e.g., assuming that the default rule has not been previously changed).

At 606, a user privacy profile associated with the user can be created or updated. In an aspect, the user privacy profile 120 of the user can be created or updated in the core network 106, where the user privacy profile 120 can be stored in the privacy profile database 118. At 608, the at least one privacy rule can be stored in the user privacy profile associated with the user. In one aspect, the user privacy profile 120 comprising the privacy rule(s) can be stored in the privacy policy database 118, where an applicable privacy rule(s) can be retrieved from the user privacy profile 120 of the user when a service request associated with the UE 102 of the user is received by the core network 106. In another aspect, the at least one privacy rule can be applied dynamically in real time to data flow associated with a current service request when the at least one privacy rule is determined to be applicable to the data flow associated with a current service request.

Figure 7:
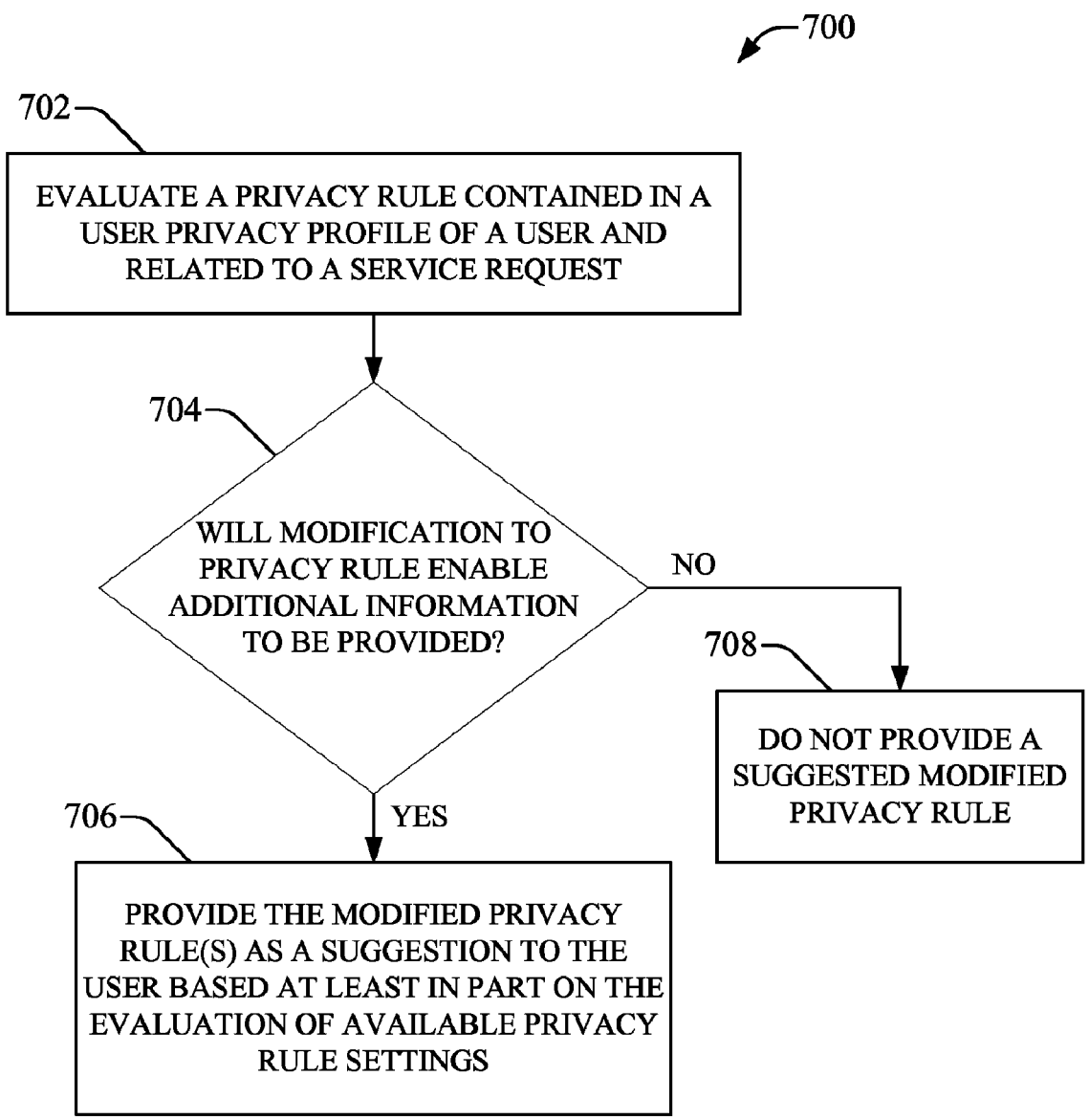
FIG. 7 depicts a flowchart of an example methodology that can provide a suggested modification of a privacy rule to facilitate customizing or optimizing services associated with a communication device of a user in accordance with an aspect of the disclosed subject matter.

FIG. 7 depicts a flowchart of an example methodology 700 that can provide a suggested modification of a privacy rule to facilitate customizing or optimizing services associated with a UE of a user in accordance with an aspect of the disclosed subject matter. At 702, a privacy rule contained in a user privacy profile of a user and related to a service request can be evaluated. In an aspect, the DPI engine 116 can evaluate the privacy rule to facilitate determining whether a modification to the privacy rule will enable the service to provide additional information to the user. For example, if the user has selected a privacy rule related to the service that allows minimal DPI (e.g., inspection of a small portion of the data protocol structures, as opposed to all data protocol structures and/or data payload), the DPI engine 116 can evaluate that privacy rule setting as well as other available privacy rule settings to determine whether allowing additional DPI will enable the service to provide additional information to the user.

At 704, a determination can be made regarding whether a modification to the privacy rule will enable the service to provide additional information to the user to facilitate customization of the service or results associated with the service. For example, the DPI engine 116 can evaluate the available privacy settings related to the service and can determine that a modification that allows a deeper packet inspection than the current privacy rule allows will enable more information to be provided to the user in relation to the requested service (e.g., modified privacy rule can allow inspection of location information related to data flow associated with the service request, and the location information can facilitate providing location-based information in relation to the service, such as location-based information regarding restaurants in a particular location).

If it is determined that a modification to a privacy rule in a user privacy profile can result in additional information being provided to the user associated with the user privacy profile, at 706, the modified privacy rule(s) can be provided as a suggestion to the user based at least in part on the evaluation of available privacy rule settings. In an aspect, a modified privacy rule(s) can be provided as a suggested modification to the user, where additional information (e.g., contextual information) can be provided with each suggested modified privacy rule so that the user can be aware of what information in the data flow (e.g., data protocol structure(s), data payload) will be examined by the particular modified privacy rule, the additional information that can be provided the user if the particular suggested modified privacy rule is adopted by the user, and/or information related to the customization of the service or results provided by the service if the suggested modified privacy rule is adopted by the user. In an aspect, if desired, the user can select the suggested modified privacy rule, where the selection can be received by the core network 106, and the modified privacy rule can be applied dynamically in real time to data flow associated with a current service request when the modified privacy rule is determined to be applicable to the data flow associated with a current service request. If, at 704, it is determined that a rule modification is not available or a rule modification will not provide additional information to the user in relation to the requested service, at 708, no suggested modified privacy rule is provided, for example, to the user.

Figure 8:
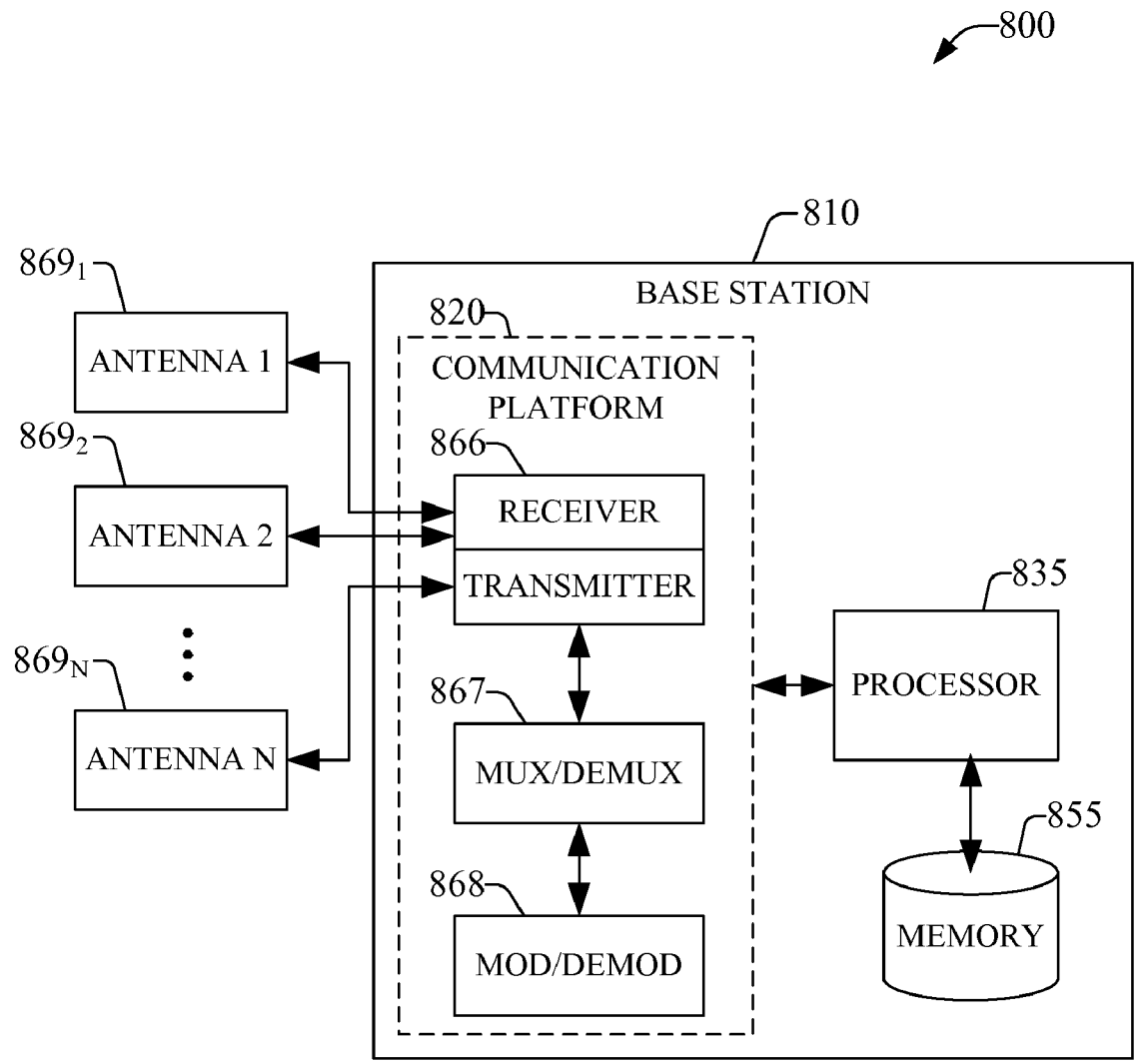
FIG. 8 depicts a block diagram of an example embodiment of a base station that can enable and exploit features or aspects of the subject innovation and that utilizes aspects of the subject innovation in accordance with various aspects of the disclosed subject matter.

To provide further context for various aspects of the subject specification, FIG. 8 illustrates a block diagram of an example embodiment of a base station that can enable and exploit features or aspects of the subject innovation and that utilize aspects of the subject innovation in accordance with various aspects of the subject specification.

With respect to FIG. 8, in embodiment 800, the base station 810 can receive and transmit signal(s) from and to wireless devices like access points (e.g., base stations, femto access points), access terminals, wireless ports and routers, and the like, through a set of antennas $869_1$-$869_N$. It should be appreciated that while antennas $869_1$-$869_N$ are a part of a communication platform 820, which comprises electronic components and associated circuitry that can provide for processing and manipulation of received signal(s) and signal(s) to be transmitted. In an aspect, the communication platform 820 can include a receiver/transmitter 866 that can convert signal from analog to digital upon reception, and from digital to analog upon transmission. In addition, receiver/transmitter 866 can divide a single data stream into multiple, parallel data streams, or perform the reciprocal operation. Coupled to receiver/transmitter 866 can be a multiplexer/demultiplexer 867 that can facilitate manipulation of signal in time and frequency space. The multiplexer/demultiplexer (mux/demux) 867 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 867 can scramble and spread information (e.g., codes) according to substantially any code known in the art, e.g., Hadamard-Walsh codes, Baker codes, Kasami codes, polyphase codes, and so on. A modulator/demodulator (mod/demod) 868 also can be part of operational group 825, and can modulate information according to multiple modulation techniques, such as frequency modulation, amplitude modulation (e.g., M-ary quadrature amplitude modulation (QAM), with M a positive integer), phase-shift keying (PSK), and the like.

The base station 810 also can comprise a processor 835 configured to confer and/or facilitate providing functionality, at least partially, to substantially any electronic component in or associated with the base station 810. In addition, processor 835 can facilitate operations on data (e.g., symbols, bits, or chips) for multiplexing/demultiplexing, such as effecting direct and inverse fast Fourier transforms, selection of modulation rates, selection of data packet formats, inter-packet times, etc. A memory 855 can store data structures, code instructions, system or device information like policies and specifications, code sequences for scrambling, spreading and pilot transmission, floor plan configuration, access point deployment and frequency plans, scheduling policies, and so on.

In embodiment 800, processor 835 can be coupled to the memory 855 in order to store and retrieve information desired to operate and/or confer functionality to the communication platform 820 and other operational components of base station 810.

It is to be appreciated and understood that components (e.g., GW, DPI engine, privacy policy database, user privacy profile, . . . ), as described with regard to a particular system or methodology, can include the same or similar functionality as respective components as described with regard to other systems or methodologies disclosed herein As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques.

The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
an engine that performs deep packet inspection on a data flow associated with a service request received from a mobile communication device based on a privacy rule selected via the mobile communication device, and generates a subset of service-related results that is customized based on the deep packet inspection performed on the data flow, wherein the privacy rule indicates a defined level for the deep packet inspection performed on the data flow, and wherein
the engine evaluates the privacy rule related to the service request and contained in a user privacy profile associated with a user of the mobile communication device, determines whether modification of the privacy rule, including modification of the defined level of the deep packet inspection performed on the data flow to a deeper level of deep packet inspection, enables additional information beyond the subset of information to be provided to the mobile communication device in response to the service request, and provides a suggestion to modify the privacy rule to a different privacy rule in response to a determination that modification of the privacy rule to the different privacy rule enables the additional information to be provided to the mobile communication device in response to the service request, wherein the different privacy rule is associated with the deeper level of the deep packet inspection on the data flow than the defined level of the deep packet inspection associated with the privacy rule; and
a network component that provides the subset of service-related results to the mobile communication device.

2. The system of claim 1, wherein the privacy rule specifies that the deep packet inspection is performed on the data flow associated with the service request to a level, wherein a data payload of the data flow is inspected by the engine.

3. The system of claim 1, wherein the deep packet inspection performed on the data flow by the engine yields a subset of information that cannot be obtained by performance of shallow packet inspection on the data flow, the shallow packet inspection comprising inspection of a protocol header associated with the data flow, wherein the engine customizes the subset of service-related results based on the subset of information.

4. The system of claim 3, wherein the subset of information comprises location-based information, and the subset of service-related results are obtained based on the location-based information.

5. The system of claim 1, further comprising:
a gateway component that receives the service request and initiates identification of a service associated with the service request, and in response to identification of the service, the gateway component determines whether the privacy rule is applicable to the service.

6. The system of claim 5, wherein the gateway component facilitates a process of the service with no deep packet inspection performed on the data flow in response to a determination that the privacy rule is inapplicable to the service.

7. The system of claim 5, wherein the gateway component determines that the deep packet inspection is performed on the data flow associated with the service in response to the service being identified and the privacy rule being applicable to the service.

8. The system of claim 5, further comprising:
a policy server that facilitates maintenance and provision of a user privacy profile associated with a user of the mobile communication device and provides the privacy rule to the gateway component in response to attachment of the mobile communication device to a core network component;
a policy enforcer that is associated with the policy server and the gateway component, and applies and enforces policy and charging control rules to the data flow to inspect the data flow on a shallow packet inspection level; and
a privacy policy database that is associated with the policy server and stores the user privacy profile.

9. The system of claim 8, wherein the engine facilitates creation of the privacy rule via rule selection information received from the mobile communication device of the user and the privacy rule is stored in the user privacy profile.

10. The system of claim 8, wherein the user privacy profile initially contains a default privacy rule that specifies that no deep packet inspection is to be performed on the data flow associated with the at least one service request, and the default rule is modifiable to permit the defined level of the deep packet inspection performed on the data flow in accordance with the privacy rule.

11. The system of claim 1, wherein the privacy rule is based on a type of service being accessed.

12. The system of claim 11, wherein the mobile communication device is a mobile phone.

13. A method, comprising:
performing deep packet inspection on a data flow associated with a service request for a service related to a communication device in accordance with a privacy rule selected at the communication device, wherein the privacy rule specifies a defined level of the deep packet inspection performed on the data flow;
customizing a subset of service-related results based on a subset of information obtained from the deep packet inspection performed on the data flow;
evaluating the privacy rule related to the service request and contained in a user privacy profile associated with a user of the communication device;
determining whether modifying the privacy rule, including modifying the defined level of the deep packet inspection performed on the data flow to a deeper level of deep packet inspection, enables additional information beyond the subset of information to be provided to the communication device in response to the service request; and providing a suggestion to modify the privacy rule to a different privacy rule in response to determining that modifying the privacy rule to the different privacy rule enables the additional information to be provided to the communication device in response to the service request, wherein the different privacy rule is associated with the deeper level of the deep packet inspection on the data flow than the defined level of the deep packet inspection associated with the privacy rule.

14. The method of claim 13, further comprising:
determining that the privacy rule specifies that the deep packet inspection is to be performed on a data payload of the data flow; and
performing the deep packet inspection on the data payload of the data flow in response to determining that the privacy rule specifies that the deep packet inspection is to be performed on the data payload of the data flow associated with the service request.

15. The method of claim 13, wherein the performing the deep packet inspection on the data flow yields the subset of information, which cannot be obtained based on shallow packet inspection being performed on the data flow, the subset of information comprises contextual information related to the service, and the shallow packet inspection comprises comprising inspection of a protocol header associated with the data flow.

16. The method of claim 13, further comprising:
receiving the service request; and
analyzing the service request to attempt to identify the service associated with the service request.

17. The method of claim 16, further comprising:
identifying the service; and
analyzing the privacy rule to determine whether the privacy rule relates to the service.

18. The method of claim 17, further comprising:
determining that the privacy rule relates to the service; and
applying the privacy rule to the data flow to facilitate performing the deep packet inspection on the data flow.

19. The method of claim 17, further comprising:
performing shallow packet inspection of the data flow in response to determining that the privacy rule does not relate to the service.

20. The method of claim 13, further comprising:
providing a subset of available privacy rules;
receiving information indicating selection of the privacy rule from the subset of available privacy rules; and
storing the privacy rule in a user privacy profile associated with a user of the communication device.

21. The method of claim 13, further comprising:
retrieving the privacy rule in response to the communication device attaching to a core network; and
utilizing the privacy rule to perform the deep packet inspection on the data flow.

22. The method of claim 13, further comprising:
setting a default privacy rule for a user privacy profile associated with a user of the communication device, wherein the default privacy rule specifies that the deep packet inspection is not to be performed on the data flow.

23. A non-transitory computer-readable medium having instructions stored thereon that, in response to execution, cause a device to perform operations, comprising:
evaluating a current privacy rule related to a service request and contained in a user privacy profile associated with a mobile communication device;

determining whether modifying the current privacy rule, including modifying a defined level of deep packet inspection performed on a data flow associated with the service request to a deeper level of deep packet inspection, enables additional information beyond a subset of information to be provided to the mobile communication device in response to the service request using the current privacy rule; and providing a suggestion to modify the current privacy rule to a different privacy rule in response to determining that modifying the current privacy rule to the different privacy rule enables the subset of information and the additional information to be provided to the mobile communication device in response to the service request, wherein the different privacy rule is associated with the deeper level of the deep packet inspection on the data flow than the defined level of the deep packet inspection associated with the current privacy rule;

performing the deep packet inspection on the data flow associated with the service request for a service related to the mobile communication device based on selection of the different privacy rule selected at the mobile communication device, wherein the different privacy rule relates to a defined the deeper level of the deep packet inspection performed on the data flow;

modifying a subset of results associated with the service based on the subset of information and the additional information obtained from the deep packet inspection performed at the deeper level on the data flow; and initiating directing of the subset of results to the mobile communication device.

24. An apparatus comprising:
a gateway component that analyzes a service request received from a communication device to identify a service associated with the service request; and
an engine that performs deep packet inspection on a data flow associated with the service request associated with the communication device in accordance with privacy rule input to the communication device, and communicates a subset of customized service-related results associated with the service to the communication device based on a subset of information obtained from the deep packet inspection performed on the data flow, wherein the privacy rule relates to a defined level of the deep packet inspection performed on the data flow, and wherein
the engine evaluates the privacy rule related to the service request and contained in a user privacy profile associated with the communication device, determines whether modification of the privacy rule, including modification of the defined level of the deep packet inspection performed on the data flow to a deeper level of deep packet inspection, enables additional information beyond the subset of information to be provided to the communication device in response to the service request, and provides a suggestion to modify the privacy rule to a different privacy rule in response to a determination that modification of the privacy rule to the different privacy rule enables the additional information to be provided to the communication device in response to the service request, wherein the different privacy rule is associated with the deeper level of the deep packet inspection on the data flow than the defined level of the deep packet inspection associated with the privacy rule.

25. A communication device, comprising:
a communication component that transmits a service request to access a service to a core network; and a privacy management component that presents, via the communication device, a subset of service-related results that is customized based on a privacy rule selected from a subset of available privacy rules in response to selection input received by the communication device, wherein the communication component transmits the privacy rule to the core network to facilitate update of a user privacy profile of a user associated with the communication device, the privacy rule facilitates deep packet inspection of a data flow associated with the service to facilitate customization of service results to generate the subset of results based on a subset of information obtained from the deep packet inspection performed on the data flow, and the privacy rule relates to a defined level of the deep packet inspection to be performed on the data flow, and wherein the privacy management component receives a suggestion to modify the privacy rule to a different privacy rule in response to an evaluation of the privacy rule and the different privacy rule and a determination that modification of the privacy rule to the different privacy rule enables a second subset of information to be provided to the communication device in response to the service request, wherein the different privacy rule is associated with a deeper level of deep packet inspection on the data flow than the defined level of the deep packet inspection associated with the privacy rule, and the second subset of information comprises the subset of information and additional information.

* * * * *